(12) United States Patent
Yamada et al.

(10) Patent No.: US 6,196,197 B1
(45) Date of Patent: Mar. 6, 2001

(54) ENGINE CONTROL APPARATUS AND METHOD HAVING CYLINDER-CHARGED AIR QUANTITY CORRECTION BY INTAKE/ EXHAUST VALVE OPERATION

(75) Inventors: Masakazu Yamada, Inazawa; Hideki Morishima, Oqaki; Satoshi Koike, Kariya; Hideki Yukumoto, Kariya; Masaomi Inoue, Kariya; Naoyuki Kamiya, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/212,563

(22) Filed: Dec. 16, 1998

(30) Foreign Application Priority Data

Jan. 16, 1998 (JP) .................................................. 10-006213
Oct. 28, 1998 (JP) .................................................. 10-306454

(51) Int. Cl.[7] ............................. F02M 51/00; F02D 41/18
(52) U.S. Cl. ........................ 123/480; 123/681; 123/90.15
(58) Field of Search ................................. 123/90.15, 480, 123/681

(56) References Cited

U.S. PATENT DOCUMENTS

| | | |
|---|---|---|
| 4,986,243 | 1/1991 | Weissler, II et al. . |
| 5,054,451 * | 10/1991 | Kushi .................................. 123/478 |
| 5,337,719 * | 8/1994 | Togai .................................. 123/478 |
| 5,590,632 | 1/1997 | Kato et al. . |
| 5,635,634 | 6/1997 | Reuschenbach et al. . |
| 5,714,683 | 2/1998 | Maloney . |
| 5,931,136 * | 8/1999 | Isobe et al. ........................... 123/492 |
| 5,967,125 * | 10/1999 | Morikawa .......................... 123/90.15 |
| 6,000,375 * | 12/1999 | Isobe ................................. 123/90.15 |
| 6,006,725 * | 12/1999 | Stefanoplou et al. ............ 123/90.15 |

FOREIGN PATENT DOCUMENTS

| | | |
|---|---|---|
| 0651149 A1 | 10/1994 | (EP) . |
| 5-296082 | 11/1993 | (JP) . |
| 6-21592 | 3/1994 | (JP) . |
| WO 97/35106 | 9/1997 | (WO) . |

* cited by examiner

*Primary Examiner*—Erick Solis
(74) *Attorney, Agent, or Firm*—Nixon & Vanderhye P.C.

(57) ABSTRACT

A basic cylinder-charged air quantity is determined by a first-order delay processing of an intake air quantity per rotation. Next, an estimated value of a change portion of the cylinder-charged air quantity caused by a change in intake valve timing is computed on the basis of engine speed, throttle opening angle, displacement angle of the intake valve timing. Then, the estimated value of the change portion of the cylinder-charged air quantity is processed second-time by the first-order delay. A difference between the estimated value of a change portion of the cylinder-charged air quantity and a value obtained by processing the estimated value second-time by the first-order delay is added as a delay correction to the basic cylinder-charged air quantity, thereby obtaining an actual cylinder-charged air quantity with a change in the intake valve timing.

10 Claims, 8 Drawing Sheets

ENGINE CONTROL APPARATUS AND METHOD HAVING CYLINDER-CHARGED AIR QUANTITY CORRECTION BY INTAKE/EXHAUST VALVE OPERATION

CROSS REFERENCE TO RELATED APPLICATION

This application relates to and incorporates herein by reference Japanese Patent Applications No. 10-6213 filed on Jan. 16, 1998 and No. 10-306454 filed on Oct. 28, 1998.

BACKGROUND OF THE INVENTION

1. Field of the Invention

The present invention relates to an internal combustion engine control apparatus and method, which computes the quantity of air to be charged into each cylinder of an internal combustion engine provided with a variable valve mechanism for changing at least one of valve timing and valve lift characteristics.

2. Related Art

Recently, internal combustion engines for vehicles are equipped with a variable valve timing mechanism and a variable valve lift mechanism (hereinafter collectively referred to as the "variable valve mechanism") for the purpose of improving engine output, reducing fuel consumption, and reducing exhaust emission. In the internal combustion engine having the variable valve mechanism, an air flow meter (or an intake air pressure sensor) mounted in an intake pipe is adopted for detecting the quantity of intake air and calculating the quantity of air (cylinder-charged air quantity) to be charged into the cylinder in accordance with the detected intake air quantity (or the intake pipe air pressure).

If the valve timing or valve lift characteristic of the intake/exhaust valve varies, the amount of overlap of the intake/exhaust valve opening period varies and the amount of EGR (the ratio of residual exhaust gases) in the internal combustion engine varies, thereby the quantity of air to be charged into the cylinder varies. There is, however, a time delay until the detection, by the air flow meter (or the intake air pressure sensor), of the change in the quantity of air to be charged into the cylinder. This is because a surge tank of a relatively large volume mounted in the intake air passage between the air flow meter (or the intake air pressure sensor) and the internal combustion engine delays pressure propagation from the internal combustion engine to the air flow meter (or the intake air pressure sensor). Therefore there arises a problem that the quantity of air to be charged into the cylinder can not accurately be computed by the use of the detected value from the air flow meter (or the intake air pressure sensor).

For computing the quantity of air to be charged into the cylinder from detected values (hereinafter called the "detected load value") of the quantity of intake air or the intake air pressure, there has been proposed by JP-B2-6-21592 a method for computing the quantity of air to be charged into the cylinder by the first-order delay processing of the detected load value. This method aims at correcting the characteristics that, in the system provided with a throttle valve in the intake air passage, the detected load value becomes excessively large or excessively small with respect to the actual quantity of air to be charged into the cylinder, when the throttle valve opens or closes rapidly.

In the system for computing the quantity of air to be charged into the cylinder through the first-order processing of the detected load value as stated above, when the variable valve mechanism is adopted, for instance when the variable valve mechanism has varied to increase the quantity of air to be charged into the cylinder, the detected load value is further subjected to the first-order delay processing notwithstanding the detected load value is smaller than the actual quantity of air to be charged into the cylinder. It is, therefore, possible that the computed quantity of air to be charged into the cylinder will differ largely from the actual quantity of air to be charged into the cylinder.

SUMMARY OF THE INVENTION

It is, therefore, an object of the present invention to provide an internal combustion engine control apparatus and method which, in an internal combustion engine with a variable valve mechanism, the quantity of air to be charged into each cylinder can be computed accurately from the detected load value.

It is another object of the present invention to provide an internal combustion engine control apparatus and method for computing the quantity of air to be charged into the cylinder after the delay processing of the detected load value, to thereby enable the accurate computation of the quantity of air to be charged into the cylinder.

According to an internal combustion engine control apparatus and method of the present invention, an engine is equipped with a variable valve mechanism for changing at least one of the valve opening/closing timing and the valve lift characteristic of an intake valve and/or exhaust valve in accordance with engine operating condition. A load detector detects an engine load (quantity of intake air or intake air pressure). A computer corrects a detection delay until the detection of a change in the quantity of air to be charged into the cylinder caused by a change of the variable valve mechanism (a change in the valve timing and a change in the valve lift characteristic), thereby determining the quantity of air to be charged actually into the cylinder by the change of the variable valve mechanism. Thus it is possible to accurately determining the quantity of air to be charged into the cylinder from the detected load value even when the quantity of air to be charged into the cylinder is changed by the change of the variable valve mechanism.

BRIEF DESCRIPTION OF THE DRAWINGS

Other objects, features and advantages of the present invention will become more apparent from the following detailed description made with reference to the accompanying drawings.

In the drawings.

DETAILED DESCRIPTION OF THE PREFERRED EMBODIMENT

[First Embodiment]

The first embodiment of the present invention applied to an internal combustion engine will hereinafter be described with reference to FIG. 1 to FIG. 6.

Figure 1:
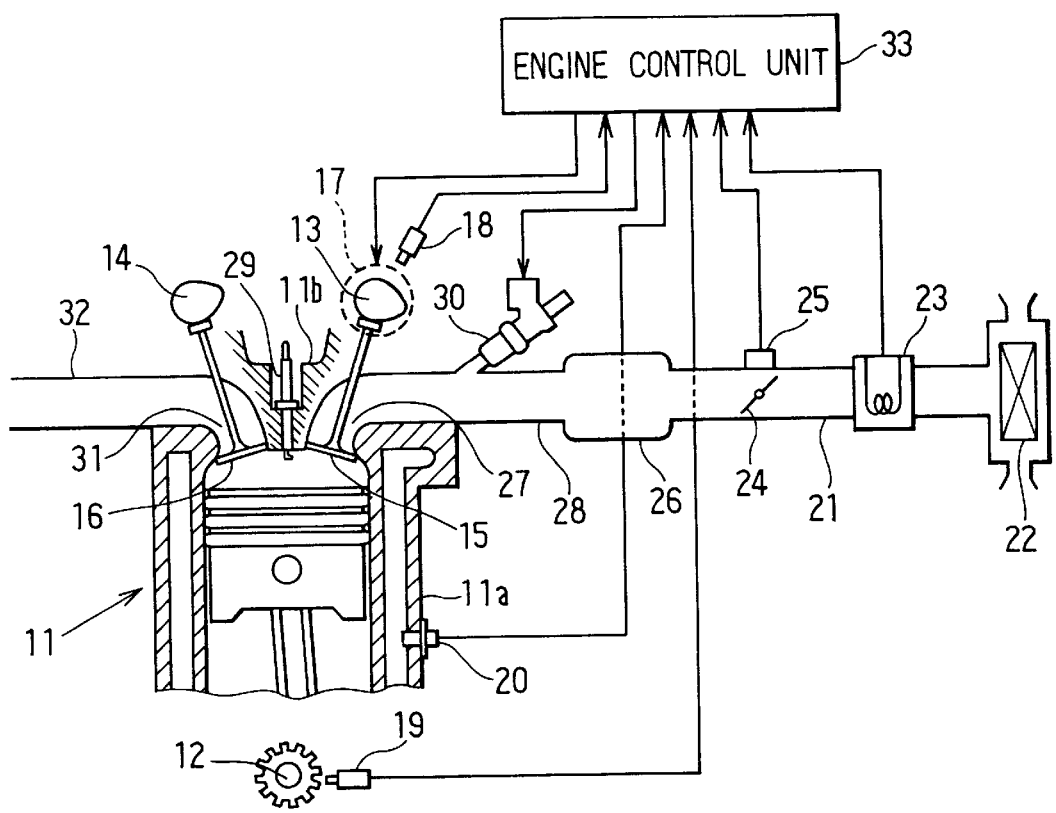
FIG. 1 is a schematic diagram of an engine control system according to a first embodiment of the present invention.

Referring first to FIG. 1, an internal combustion engine 11 is a DOHC (dual overhead cam) type, in which the power of a crankshaft 12 is transmitted to an intake camshaft 13 and an exhaust camshaft 14 through a timing chain (not shown), thereby opening and closing an intake valve 15 and an exhaust valve 16 by the camshafts 13 and 14. The intake camshaft 13 is provided with a hydraulically driven variable valve timing mechanism 17 which regulates the amount of advance angle (displacement angle) $\Delta\theta$ of the intake camshaft 13 in relation to the crankshaft 12.

In the vicinity of the intake camshaft 13 is disposed a camshaft sensor 18 for detecting the rotational angle of the intake camshaft. Also in the vicinity of the crankshaft 12 is mounted a crankshaft sensor 19 for detecting the rotational angle of the crankshaft. Furthermore, a coolant temperature sensor 20 for detecting the coolant temperature is mounted in a cylinder block 11a of the engine 11, and a spark plug 29 is mounted in each cylinder in the cylinder head 11b.

An air cleaner 22 is mounted at the upstream end portion of an intake pipe 21. A hot-wire type air flow meter 23 (the load detector) for detecting the quantity of intake air on its downstream side. On the downstream side of the air flow meter 23 is mounted a throttle valve 24. The amount of opening (throttle opening angle) of the throttle valve 24 is detected by a throttle sensor 25. On the downstream side of the throttle valve 24 in the intake pipe 21 a surge tank 26 is connected. The surge tank 26 and the intake port 27 of each cylinder of the engine 11 are connected by means of an intake manifold 28. In the intake manifold 28 of each cylinder a fuel injection valve 30 is mounted.

Furthermore, in the exhaust pipe 32 connected to the exhaust port 31 of the engine 11 an oxygen concentration sensor (not shown) is mounted to detect oxygen concentrations present in catalyst (not shown) for exhaust gas purification and exhaust gases.

Output power of each sensor mentioned above is inputted into an engine control circuit (hereinafter referred to as the ECU) 33. The ECU 33 is composed primarily of a microcomputer, to thereby control the ignition timing of the spark plug 29 and the valve timing of the intake valve 15 in accordance with engine operating condition detected by each sensor, and to determine the quantity of air to be charged into the cylinder and the amount of fuel to be injected according to a program shown in FIG. 2 to FIG. 6.

Figure 2:
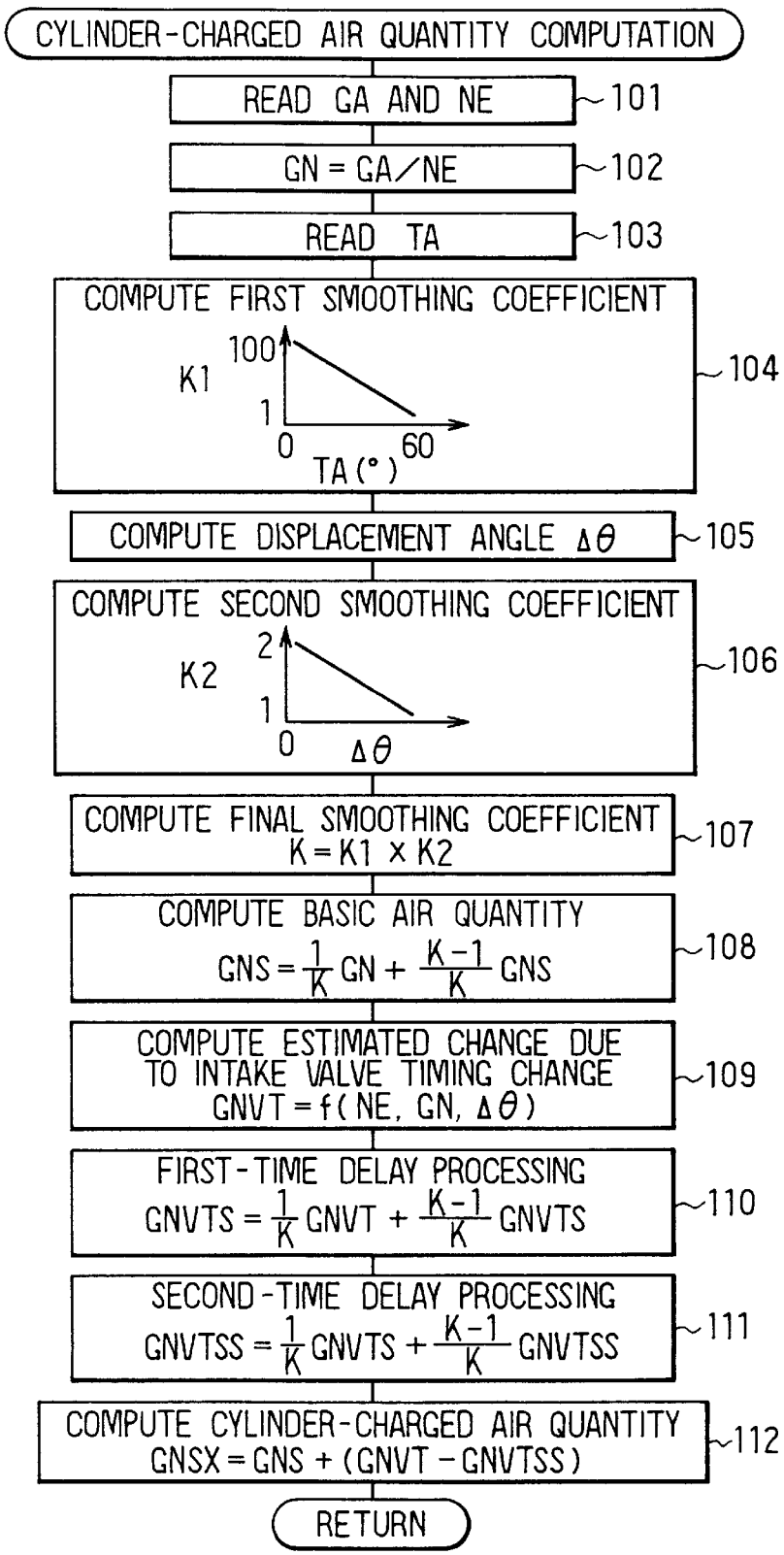
FIG. 2 is a flow diagram schematically showing a processing of a cylinder-charged air quantity computing program in the first embodiment.

The ECU 33 computes the quantity of air (the cylinder-charged air quantity) to be charged into the cylinders of the engine by executing the cylinder-charged air quantity computing program shown in FIG. 2 every specified timing (e.g., every 4 ms). When the program is started, first at Step 101, the quantity of intake air GA metered by the air flow meter 23 and the engine speed NE detected by the output pulse cycle of the crankshaft sensor is read in. Subsequently at Step 102, the quantity of inducted air per rotation GN (=GA/NE) is computed.

At Step 103, throttle opening angle TA detected by the throttle sensor 25 is read in. Then, at Step 104, the first smoothing coefficient corresponding to the throttle opening angle TA is computed in accordance with a preset map. The map characteristic of the first smoothing coefficient K1 is set so that the first smoothing coefficient K1 will decrease with an increase in the amount of throttle opening angle TA.

Then at Step 105 the amount of advance angle of the intake camshaft 13 in relation to the crankshaft 12, that is, the displacement angle $\Delta\theta$ of the intake valve timing, is computed on the basis of the rotational angle $\theta c$ of the crankshaft detected by the crankshaft sensor 19 and the rotational angle $\theta i$ of the intake camshaft detected by the camshaft sensor 18. Then, at Step 106, the second smoothing coefficient K2 corresponding to the displacement angle $\Delta\theta$ of the intake valve timing is computed from a preset map. The map characteristic of the second smoothing coefficient K2 is set so that with an increase in the displacement angle $\Delta\theta$ of the intake valve timing, the second smoothing coefficient K2 will decrease.

Subsequently at Step 107 the final smoothing coefficient K is determined by multiplying the first smoothing coefficient K1 by the second smoothing coefficient K2. At the next Step 108 the basic cylinder-charged air quantity GNS is computed by the first-order delay processing (smoothing) of the quantity of intake air GN per rotation by the following equation by the use of the final smoothing coefficient K.

$$GNS(i)=(1/K) \cdot GN+((K-1)/K) \cdot GNS(i-1)$$

where GNS(i) is the current value, and GNS(i-1) is the preceding value. The basic cylinder-charged air quantity GNS corresponds to the cylinder-charged air quantity which delays by a change in the intake valve timing. The processing at Step 108 plays a role as the basic cylinder-charged air quantity computing means which is stated in the scope of claims.

At the next Step 109 the estimated value GNVT of a change in the cylinder-charged air quantity due to changes in the intake valve timing taken into consideration is computed on the basis of the engine speed NE, the throttle opening angle TA, and the displacement angle $\Delta\theta$ of the intake valve timing. Computation of the estimated value GNVT of a change in the cylinder-charged air quantity, as schematically shown in FIG. 3, has a plurality of maps for determining the estimated value GNVT of a change in the quantity of cylinder-charged air quantity from the engine speed NE and the throttle opening angle TA every displacement angle $\Delta\theta$ of the intake valve timing; and from these maps a map corresponding to the displacement angle $\Delta\theta$ of the intake valve timing at that point of time is selected, thereby determining the estimated value GNVT of the change in the cylinder-charged air quantity corresponding to the engine speed NE and the throttle opening angle TA.

Figure 4:
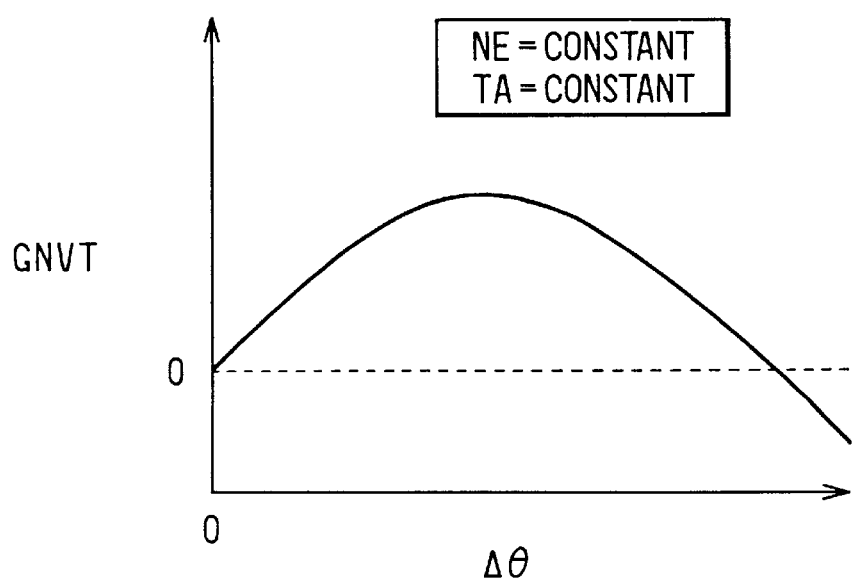
FIG. 4 is a graph showing a relation between a displacement angle Δθ of intake valve timing and an estimated value GNVT of a change of the cylinder-charged air quantity.

The characteristics of the estimated value GNVT of the change of the cylinder-charged air quantity thus determined is, as shown in FIG. 4, the estimated value GNVT of the change of the cylinder-charged air quantity increases with an increase in the displacement angle Δθ within the smaller range of the intake valve timing displacement angle Δθ; however, the increase in the estimated value GNVT of the change of the cylinder-charged air quantity soon reaches the top value. In the larger range of the displacement angle Δθ than that, the estimated value GNVT of the change of the cylinder-charged air quantity decreases with an increase in the displacement angle Δθ. This is because that, within the small range of the displacement angle Δθ, the intake valve closing timing approaches the bottom dead center to thereby increase the charge efficiency more than the decreased amount of fresh air accompanying with an increase in the amount of EGR inside, and also because that, within the large range of the displacement angle Δθ, the amount of EGR inside (the ratio of residual exhaust gases) increases to suddenly decrease the amount of fresh air with an increase in the displacement angle Δθ.

Figure 3:
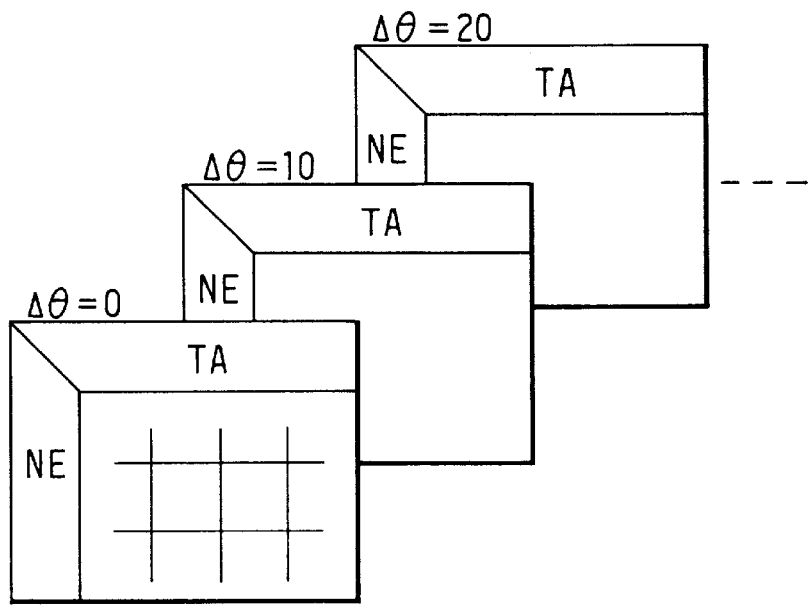
FIG. 3 is a diagram schematically showing a map for calculating an estimated value GNVT of a change of a cylinder-charged air quantity.

In the map in FIG. 3, the quantity of intake air GN per rotation may be used in place of the throttle opening angle TA. Furthermore, the estimated value GNVT of the change in the cylinder-charged air quantity may be computed, in addition to the map of FIG. 3, by the use of a functional equation using, as parameters, the engine speed NE, throttle opening angle TA (or the quantity of intake air GN per rotation), and displacement angle Δθ of the intake valve timing. It is also possible to determine the estimated value GNVT of the change in the cylinder-charged air quantity by determining, from the maps, the coefficient Ka corresponding to the displacement angle Δθ of the intake valve timing, the coefficient Kb corresponding to the throttle opening angle TA (or the quantity of intake air GN per rotation), and the coefficient Kc corresponding to the engine speed NE, and then by multiplying a reference value of the change in the cylinder-charged air quantity by a coefficient determined by multiplying or adding these three coefficients Ka to Kc.

Next, after the computation of the estimated value GNVT of the change in the cylinder-charged air quantity, the procedure proceeds to Step 110, where, using the final smoothing coefficient K, the first-order delay processing (smoothing) is conducted of the estimated value GNVT of the change in the cylinder-charged air quantity by the following equation, thereby obtaining the first-time smoothing value GNVTS of the estimate of the change in the cylinder-charged air quantity.

$$GNVTS(i)=(1/K) \cdot GNVT+((K-1)/K) \cdot GNVTS(i-1)$$

where GNVTS(i) is the current value, and GNVTS(i−1) is the preceding value. The first-time smoothing value GNVTS of the estimate of the change in the cylinder-charged air quantity is a value corresponding to the valve timing change of the estimate (the quantity of intake air) of the air flow meter 23. The detection delay of the air flow meter 23 resulting from a change in the intake valve timing can thus be corrected by the use of the delay system model of the intake air passage including the surge tank 26 ranging from the air flow meter 23 to the intake valve 15.

Subsequently, at Step 111, first-time smoothing value GNVTS of the estimate of the change in the cylinder-charged air quantity is subjected to another first-order delay processing (smoothing) to thereby determine the second-time smoothing value GNVTSS of the estimate of the change in the cylinder-charged air quantity.

$$GNVTSS(i)=(1/K) \cdot GNVTS+((K-1)/K) \cdot GNVTSS(i-1)$$

where GNVTSS(i) is the current value, and GNVTSS(i−1) is the preceding value. The second-time smoothing value GNVTSS of the estimate of the change in the cylinder-charged air quantity is the value corresponding to the change in the valve timing of the basic cylinder-charged air quantity GNS computed out at Step 108. Therefore, a difference (GNVT−GNVTSS) between the estimated value GNVT of the change in the cylinder-charged air quantity caused by the change of the intake valve timing and the second-time smoothing value GNVTSS corresponds to a false computed portion of the change in the cylinder-charged air quantity made by the ECU 33 because of the detection delay of the air flow meter 23.

Next, at Step 112, a difference (GNVT−GNVTSS) between the estimated value GNVT of the change of the cylinder-charged air quantity and the second-time smoothing value GNVTSS is added as a delay correction to the basic cylinder-charged air quantity GNS, thereby calculating out the actual cylinder-charged air quantity GNSX with the change in the intake valve timing taken into consideration.

$$GNSX=GNS+(GNVT-GNVTSS)$$

The processing at Steps 109 to 112 thus computes the correction of detection delay, and the processing at Step 112 computes the final cylinder-charged air quantity.

Figure 5:
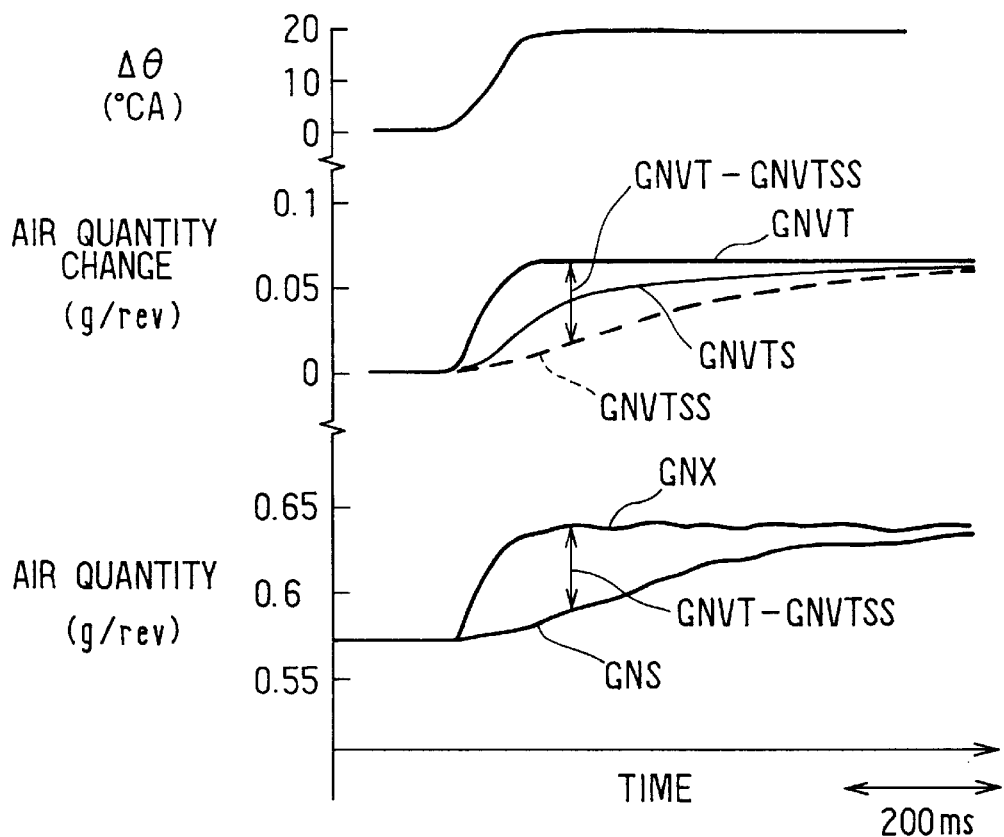
FIG. 5 is a timing diagram indicating changes in the cylinder-charged air quantity and air-fuel ratio when the intake valve timing is changed.

The timing diagram of FIG. 5 shows one example of secular changes of the displacement angle Δθ of the intake valve timing computed according to the cylinder-charged air quantity computing program in FIG. 2, the estimated value GNVT of the change of the cylinder-charged air quantity, first-time smoothing value GNVTS, second-time smoothing value GNVTSS, basic cylinder-charged air quantity GNS, and actual cylinder-charged air quantity GNSX. The timing diagram shows, for simplification of explanation, a behavior at constant throttle opening angle TA and constant engine speed NE.

As shown in the example of FIG. 5, the displacement angle Δθ of the intake valve timing increases from 0° CA to about 0° CA, the estimated value GNVT of the change in the cylinder-charged air quantity and the cylinder-charged air quantity GNSX increase. However, as is clear from the characteristics shown in FIG. 4, in the range where the displacement angle Δθ is large, as the displacement angle Δθ increases, the amount of EGR inside (the ratio of residual exhaust gases) also increases. Therefore, the estimated value GNVT of the change of the cylinder-charged air quantity and the cylinder-charged air quantity GNSX decrease.

In FIG. 5, with the change of the intake valve timing, the quantity of air to be charged into the cylinder varies. A correction corresponding to the amount of detection delay until the change is detected by the air flow meter 23 is computed from a deviation between the estimated value GNVT of the change in the cylinder-charged air quantity and the second-time smoothing value GNVTSS of this estimation. That is, the air flow meter 23 detects the change in the cylinder-charged air quantity by the first-order delay after the cylinder-charged air quantity. Furthermore, when the quantity of air to be charged into the cylinder is to be computed, the quantity of intake air detected by the first-order delay will be processed once again by the first-order delay. Consequently the change of the cylinder-charged air quantity resulting from the change of the intake valve timing will be detected by the first-order delay.

Therefore the change of the cylinder-charged air quantity resulting from the change of the intake valve timing can be given by calculating the deviation between the estimated value GNVT and the second-time smoothing value GNVTSS of the estimate. Then, it is possible to determine the actual cylinder-charged air quantity GNSX by adding the detected value of the air flow meter 23 to the basic cylinder-charged air quantity GNS that has been determined by the first-order delay processing of the estimate of the air flow meter 23.

Figure 6:
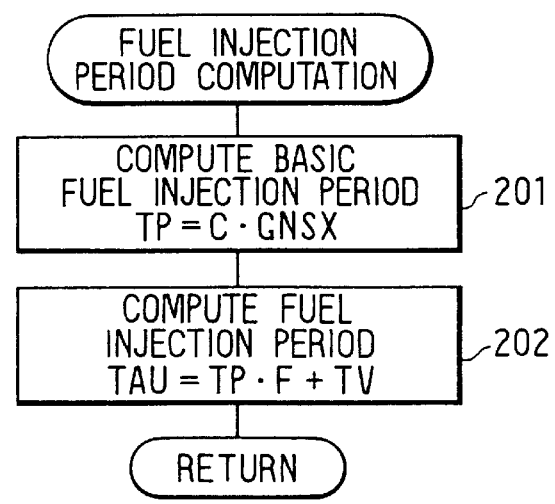
FIG. 6 is a flow diagram showing a processing of a fuel injection period computing program in the first embodiment.
Figure 7:
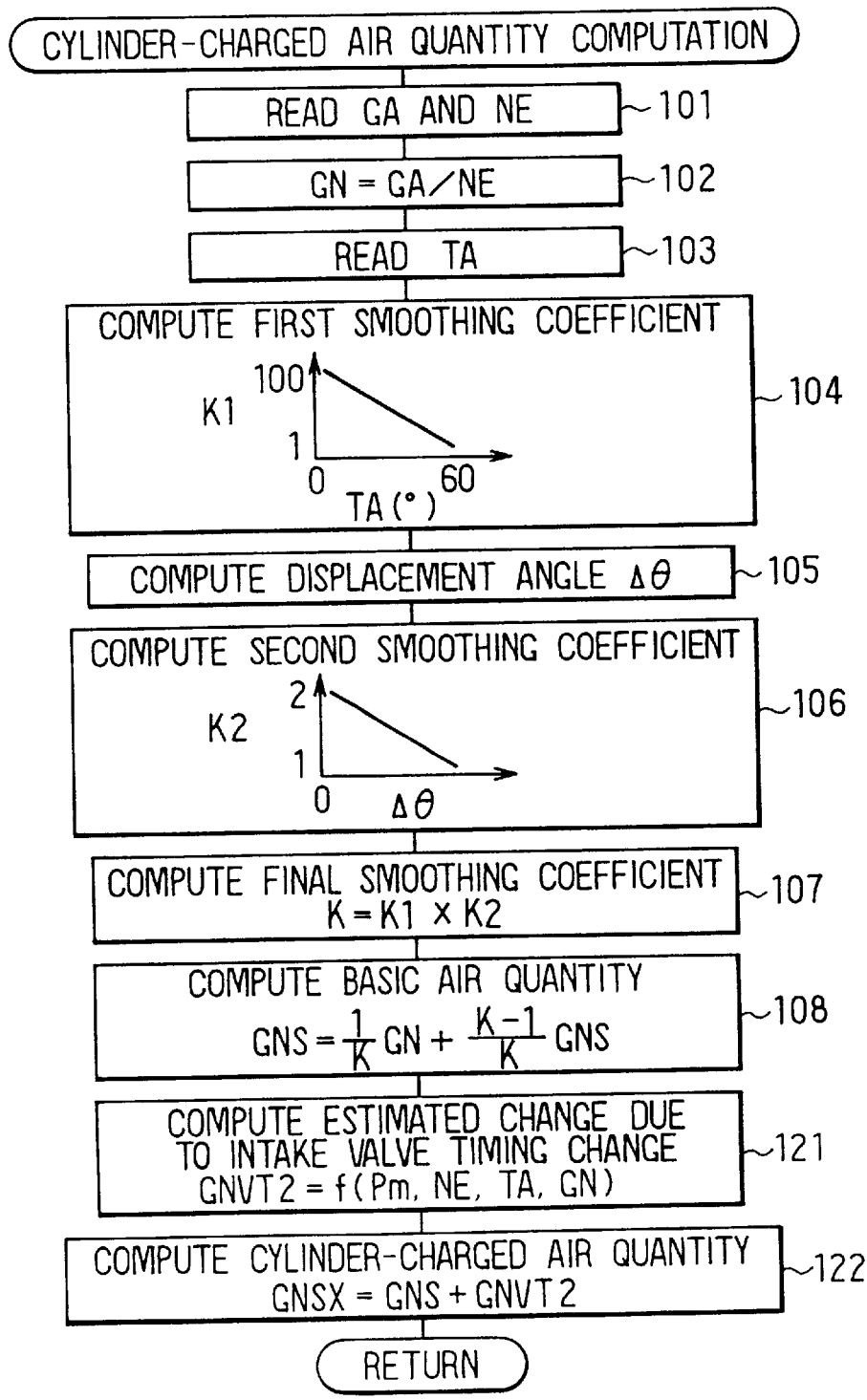
FIG. 7 is a flow diagram showing a processing of a cylinder-charged air quantity computing program according to a second embodiment of the present invention.

The fuel injection period computing program of FIG. 6 is started every time of computation of the cylinder-charged air quantity GNSX by the cylinder-charged air quantity computing program of FIG. 2, computing the fuel injection period TAU (the fuel injection quantity) as follows. First, at Step 201 the basic injection period TP is given by multiplication of the cylinder-charged air quantity GNSX by the constant C.

$$TP = C \cdot GNSX$$

Subsequently at Step 202, the fuel injection period TAU is given by the following equation by using such correction coefficients F as the air-fuel ratio feedback correction coefficient, coolant temperature correction coefficient, and learning correction coefficient, basic injection period TP, and ineffective injection period TV.

$$TAU = TP \cdot F + TV$$

where the ineffective injection period TV is a period of time during no effective fuel injection which takes place due to a response delay of the fuel injection valve 30.

According to the first embodiment, since it is possible to determine the actual cylinder-charged air quantity GNSX by correcting a detection delay during a period in which a change in the cylinder-charged air quantity caused by a change in the intake valve timing is detected at the air flow meter 23, the accurate cylinder-charged air quantity GNSX can be determined from the detected value from the air flow meter 23 even when the cylinder air quality is changed by the change of the intake valve timing. Therefore it is possible to accurately compute the amount of fuel to be injected, on the basis of the cylinder-charged air quantity GNSX.

In the first embodiment, the GNVT is smoothed second-time to obtain the GNVTSS. In this case, an approximate value of the GNVTSS may be determined by smoothing the GNVT once with a larger smoothing coefficient, for example second-time larger smoothing coefficient.

In the first embodiment, the cylinder-charged air quantity GNSX is computed from the detected value of the quantity of intake air, but may be computed by the similar method from the detected value of the intake air pressure.

[Second Embodiment]

The engine load (the quantity of intake air or the intake air pressure) to be detected by the air flow meter 23 or the intake air pressure sensor vary with a change in the throttle opening angle and a change in the valve timing. However, there is a region where the change of load caused by the change in the throttle opening angle and the change of load caused by the change in the valve timing at that time vary in opposite directions. In such a region, if it is attempted to accurately correct the detection delay of load, computing will become complicated, making it necessary to use a large capacity microcomputer and restricting computation by other controls.

In the second embodiment shown in FIG. 7 to FIG. 11, the detected value of the intake air pressure is divided into a throttle-caused component and a valve timing-caused component. In this embodiment, only the valve timing-caused component of the detected value of the intake air pressure is corrected. An intake air pressure sensor (not shown) is mounted as an engine load detector in the surge tank 26. The present embodiment is the same in system construction as that of the first embodiment.

The quantity of air to be charged into the cylinder (cylinder-charged air quantity) GNSX of the engine 11 is computed by executing the cylinder-charged air quantity computing program every specified time (e.g., every 4 ms). The processing of the program at Steps 101 to 108 is the same as the processing at Steps 101 to 108 in FIG. 2 (first embodiment). After the computation of the basic cylinder-charged air quantity GNS, the procedure proceeds to Step 121, where the estimated value of a change of the cylinder-charged air quantity GNVT2 which is caused by the change of the valve timing is computed on the basis of the intake air pressure Pm detected by the intake air pressure sensor, engine speed NE, and throttle valve opening angle TA (or the quantity of intake air GN per rotation).

Figure 8:
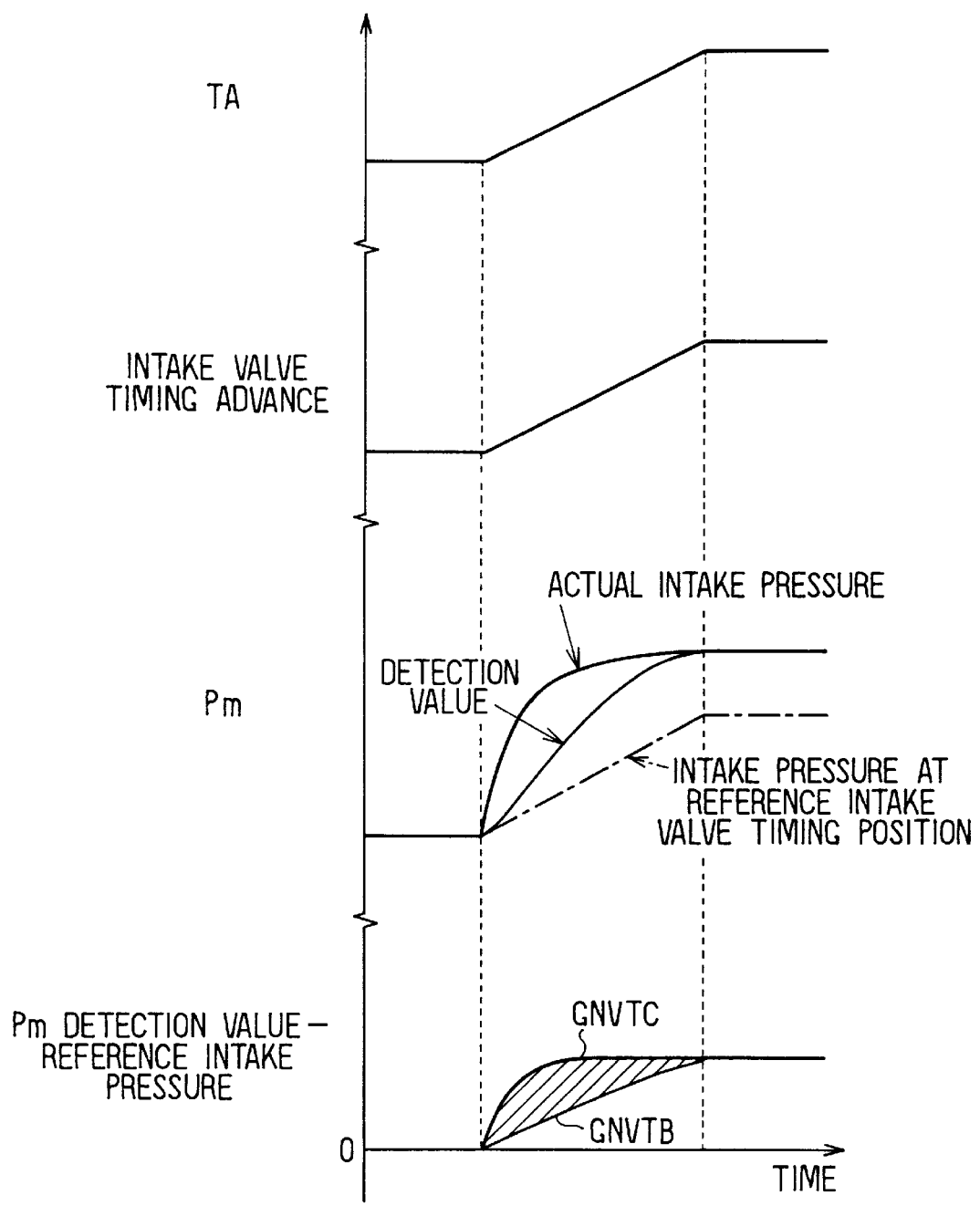
FIG. 8 is a timing diagram showing correction of detection delay of the intake air pressure sensor.

Next, the method of computing the estimated value of a change portion of the cylinder-charged air quantity GNVT2 will be explained. As shown in FIG. 8, when the amount of throttle opening angle TA is increased, the advance angle of the valve timing also increases and accordingly the intake air pressure Pm also increases. In this embodiment, taking notice of a point at which the intake air pressure Pm is changed by the throttle opening angle TA and the valve timing, the detected value of the intake air pressure Pm is first divided into a pressure of the throttle-caused component and a pressure of the valve timing-caused component.

Figure 9:
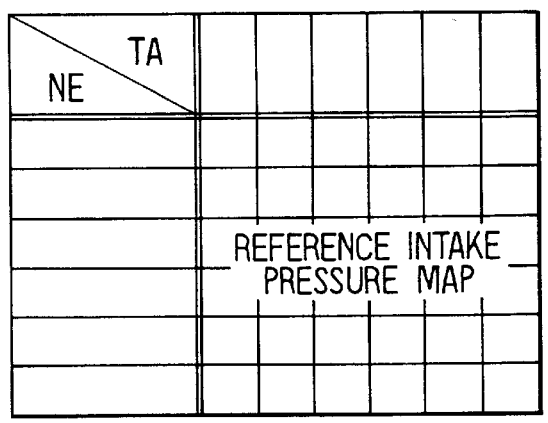
FIG. 9 is a schematic view of a reference intake air pressure map.
Figure 10:
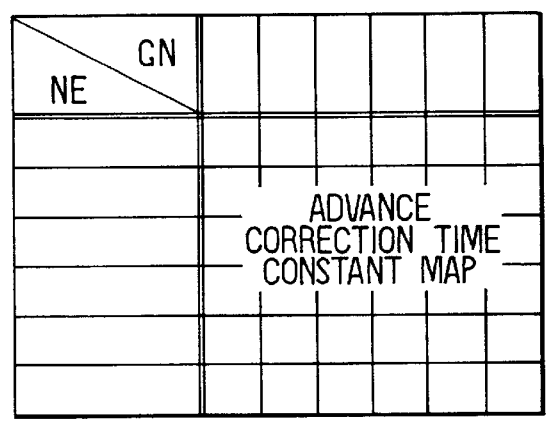
FIG. 10 is a schematic view of an advance correction time constant map.

In a specific method of division, tests and simulations are carried out to prepare the map of the intake air pressure (hereinafter referred to as the reference intake air pressure) as the two-dimensional map using the engine speed NE and the throttle opening angle TA (or the quantity of intake air per rotation GN) as parameters as shown in FIG. 9 when the valve timing is in the reference position (e.g., in the most delayed angle position). The map of the reference intake air pressure is stored in a ROM (not shown). The reference intake air pressure, being an intake air pressure at the time when the valve timing is in the reference position, corresponds to the pressure of the throttle-caused component. Accordingly when the pressure of the valve timing-caused component is to be computed, the reference intake air pressure according to the engine speed NE and the throttle opening angle TA at that point of time are determined from the reference intake air pressure map of FIG. 9, and the reference intake air pressure (corresponding to the pressure of the throttle-caused component) is subtracted from the detected value of the intake air pressure Pm at that time, thereby obtaining the detected pressure value GNVTB of the valve timing-caused component.

Subsequently, the detected value of pressure GNVTB of the valve timing-caused component is corrected by the first-order advance to thereby acquire the actual pressure GNVTC of the valve timing-caused component. At this time, retrieval of the advance correction time constant map (FIG. 10) by using the engine speed NE and the quantity of intake air per rotation GN (or the throttle opening angle TA) as parameters, to thereby determine the advance correction time constant in relation to the NE and GM at that time. Multiplication of the detected value of pressure GNVTB of the valve timing-caused component by the advance correction time constant determines the actual pressure GNVTC of the valve timing-caused component. Then, the detected value of pressure GNVTB of the valve timing-caused component is subtracted from the actual pressure GNVTC of the valve timing-caused component, to thereby determine the estimated value GNVTP of the change portion of the intake air pressure.

$$GNVTP = GNVTC - GNVTB$$

The estimated value GNVTP of the change portion of the intake air pressure becomes an intake air pressure correction for correcting the detection delay of the intake air pressure sensor caused by a change in the valve timing. Then, the estimated value GNVT2 of the change portion of the cylinder-charged air quantity is estimated from the estimated value GNVTP of the change portion of the intake air pressure. The estimated value GNVT2 of the change portion of the cylinder-charged air quantity thus determined becomes a cylinder-charged air quantity correction for correcting the detection delay of the intake air pressure sensor caused by a change in the valve timing.

Next, at Step 122, the estimated value GNVT2 of the change portion of the cylinder-charged air quantity computed at Step 121 is added to the basic cylinder-charged air quantity GNS computed at Step 108 to thereby compute out the actual cylinder-charged air quantity GNSX with a change in the valve timing taken into consideration, thus completing this program.

$$GNSX = GNS + GNVT2$$

The fuel injection period is computed by the fuel injection period computing program of FIG. 6 (first embodiment) by the use of the cylinder-charged air quantity GNSX.

Figure 11:
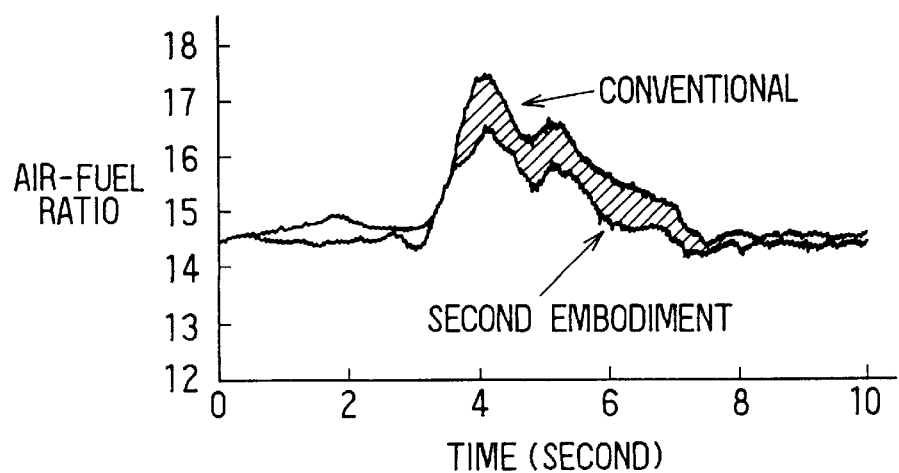
FIG. 11 is a timing diagram for measuring a change in air-fuel ratio during engine acceleration.

The change of the air-fuel ratio at the time of acceleration is measured to confirm the effect of improvement in the air-fuel ratio control in the second embodiment, thereby acquiring a result shown in FIG. 11. As is clear from the result of measurements, in the second embodiment, air-fuel ratio turbulence decreases more than conventional one within the operation range in which the valve timing varies during acceleration, thus attaining improved drivability and decreased emission gases.

In the second embodiment, the estimated value of the intake air pressure Pm is divided into the throttle-caused component and the valve timing-caused component, so that only the valve timing-caused component of the detected value by the intake air pressure sensor is corrected, and therefore it is possible to accurately correct the detection delay of the intake air pressure sensor in accordance with a change in the valve timing and, at the same time, to simplify the computing for correcting the detection delay of the intake air pressure sensor, thereby lessening the computing load of the ECU 33.

It is to be noted that the detected value of the quantity of intake air may be divided into the throttle-caused component and the valve timing-caused component to correct only the valve timing-caused component of the detected value of the quantity of intake air.

[Third Embodiment]

Figure 12:
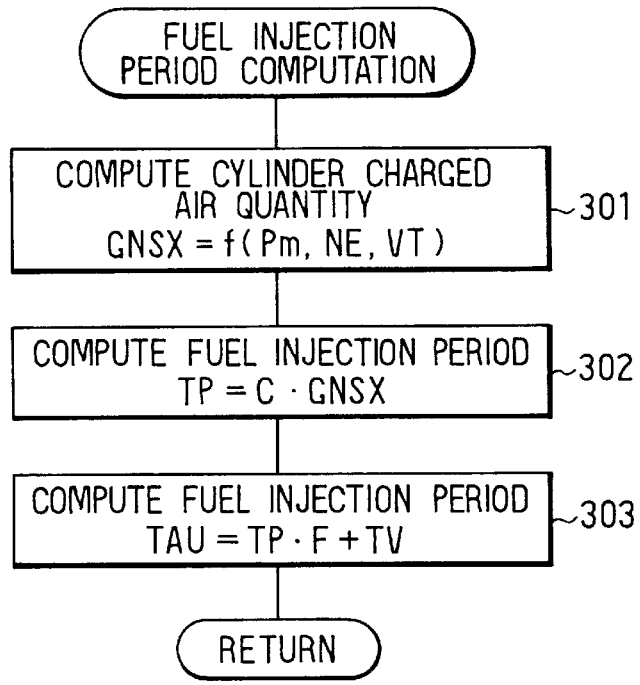
FIG. 12 is a flow diagram showing a processing of the fuel injection period computing program according to a third embodiment of the present invention.
Figure 13:
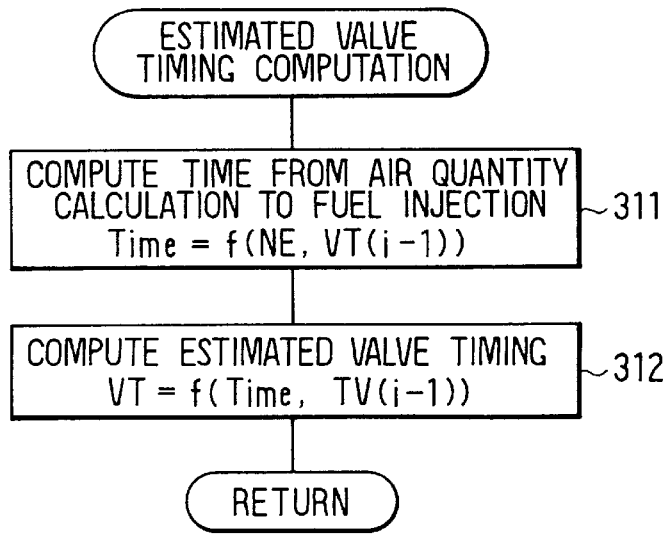
FIG. 13 is a flow diagram showing a processing of an estimated valve timing computing program in the third embodiment.

In the third embodiment shown in FIG. 12 and FIG. 13, the valve timing varies and the cylinder-charged air quantity also varies during the period from the computation of the cylinder-charged air quantity till the computation of actual amount of fuel to be injected and fuel injection. With these changes taken into account, the cylinder-charged air quantity GNSX during fuel injection is estimated at the time of computation of the cylinder-charged air quantity at Step 301 of the fuel injection period computing program in FIG. 12. That is, the cylinder-charged air quantity GNSX during fuel injection is computed by the use of a map or a functional equation on the basis of the intake air pressure Pm determined by correcting the detection delay of the intake air pressure sensor through the same processing as the second embodiment, the engine speed NE, and an estimated valve timing VT during fuel injection.

The estimated valve timing VT during fuel injection which is used at Step 301 is computed as follows by the estimated valve timing computing program shown in FIG. 13. First, at Step 311, the period of time Time from the computation of the cylinder-charged air quantity till the fuel injection is computed on the basis of the engine speed NE and the valve timing VT(i−1) at the time of computation of the cylinder-charged air quantity. Thereafter, at Step 312, the estimated valve timing VT at the time of fuel injection is computed on the basis of the period of time Time from the time of computation of the cylinder-charged air quantity till the time of fuel injection and the valve timing VT(i−1) at the time of computation of the cylinder-charged air quantity.

After the computation of the cylinder-charged air quantity GNSX at the time of fuel injection by the use of the estimated valve timing VT at the time of fuel injection obtained by the above computation, the procedure proceeds to Step 302 in FIG. 12, at which the constant C is multiplied to the cylinder-charged air quantity GNSX to thereby determine the basic injection period TP.

$$TP = C \cdot GNSX$$

Subsequently, at Step 303, the fuel injection period TAU is given by calculating the following equation by the use of various correction coefficients F, such as the air-fuel ratio feedback correction coefficient, coolant temperature correction coefficient, and learning correction coefficient, basic injection period TP, and ineffective injection period TV.

$$TAU = TP \cdot F + TV$$

At Step 301, the (current) valve timing at the fuel injection quantity computing time may be used in place of the estimated valve timing VT at the time of fuel injection when the cylinder-charged air quantity GNSX is estimated at the time of fuel injection.

It is also to be noted that, at Step 301, the current valve timing given by the fuel injection quantity computing may be used, in place of the estimated valve timing VT during fuel injection, when the cylinder-charged air quantity GNSX during fuel injection is estimated.

In each of the embodiments, it is assumed that the valve timing of only the intake valve is changed. However, the valve timing of the exhaust valve may be changed and further the valve timing of both the intake valve and the exhaust valve may also be changed. Furthermore, the present invention may be applied to a system equipped with a valve lift mechanism with the intake valve and/or the exhaust valve. Furthermore, the present invention may be applied to a system equipped with both the variable valve timing mechanism and the valve lift mechanism.

Other modifications and changes to the embodiments are also possible without departing from the spirit of the present invention.

What is claimed is:

1. An engine control apparatus, comprising:
   a variable valve mechanism for changing at least one of valve opening/closing timing and valve lift characteristics of at least one of an intake valve and an exhaust valve in accordance with engine operating condition;
   load detecting means located in one of a surge tank and an air intake passage upstream of a surge tank for detecting a load of the engine; and
   cylinder-charged air quantity computing means for correcting a delay in detecting a change in quantity of air detected by the load detector, the change being caused by a change in operation of the variable valve mechanism, and for determining an actual quantity of air charged into the cylinder in accordance with the load detected by the corrected load.

2. An engine control apparatus according to claim 1, wherein:

an intake manifold of each cylinder of the engine is connected to a downstream portion of an intake pipe via a surge tank; and the cylinder-charged air quantity computing means corrects the detection delay of the load detector by using a predetermined delay system model of an intake air passage including the surge tank and ranging from the load detector to the intake valve.

3. An engine control apparatus according to claim 1, wherein:

the cylinder-charged air quantity computing means divides the detected load into a throttle-caused component and a variable valve mechanism-caused component to thereby correct the variable valve mechanism-caused component.

4. An engine control apparatus according to claim 1, wherein:

the cylinder-charged air quantity computing means estimates the quantity of air charged into the cylinder at the time of fuel injection on the basis of the corrected load, the engine speed, and one of a control value of the variable valve mechanism at the time of computing a fuel injection quantity and a control value of the variable valve mechanism at the time of fuel injection estimated when computing the quantity of air charged into the cylinder; and fuel injection quantity computing means is provided for computing the fuel injection quantity in accordance with the quantity of air charged into the cylinder during the estimated fuel injection time.

5. An engine control apparatus according to claim 1, wherein the cylinder-charged air quantity computing means includes:

basic cylinder-charged air quantity computing means for computing a basic quantity of air charged into the cylinder which corresponds to the detected load;

detection delay correction computing means for computing a correction value corresponding to the detection delay; and final cylinder-charged air quantity computing means for computing the actual quantity of air charged into the cylinder in accordance with the basic quantity of air and the correction value.

6. An engine control apparatus according to claim 5, wherein:

the basic cylinder-charged air quantity computing means computes the basic quantity of air charged into the cylinder by processing, by a first-order delay, the detected load;

the detection delay correction computing means computes the correction from a difference between an estimated value by estimating a change in the quantity of air charged into the cylinder caused by the change of the variable valve mechanism and a value determined by processing the estimated value twice by the first-order delay; and the final cylinder-charged air quantity correction computing means computes the final quantity of air charged into the cylinder by adding the basic quantity of air charged into the cylinder and the correction value.

7. An engine control apparatus according to claim 6, wherein:

the detection delay correction computing means determines the estimated value of a change in the quantity of air charged into the cylinder on the basis of the engine speed, one of the amount of intake air and throttle opening angle, and a control value of the variable valve mechanism.

8. An engine control method for an engine having a variable valve mechanism for changing at least one of valve opening/closing timing and valve lift characteristics of at least one of an intake valve and an exhaust valve in accordance with engine operating condition, the method comprising the steps of:

determining a basic quantity of cylinder-charged air charged into a cylinder of the engine from a quantity of intake air flowing in an intake pipe of the engine using a load detector located in one of a surge tank and an intake air passage upstream of the surge tank and delay-compensating for the time delay in sensed air supply to the engine;

determining an operation change of the variable valve mechanism;

estimating a change in the basic quantity of cylinder-charged air based on at least the operation change of the variable valve mechanism;

correcting the basic quantity of cylinder-charged air by the estimated change to thereby determine a final quantity the cylinder by adding the basic quantity of air charged into the cylinder and the correction valve.

9. An engine control method according to claim 8, further comprising the step of:

determining a smoothing coefficient from the operation change of the variable valve mechanism and an opening angle of a throttle valve of the engine, wherein the basic quantity of cylinder-charged air is determined by correcting the quantity of intake air by the smoothing coefficient.

10. An engine control method according to claim 9, wherein the estimating step includes the steps of:

determining a change in the quantity of basic cylinder-charged air based on the operation change of the variable valve mechanism; and determining the estimated change in the basic quantity of cylinder-charged air by executing a first-order delay processing twice on the determined change.

* * * * *